United States Patent [19]
Goulden

[11] 4,154,513
[45] May 15, 1979

[54] SUNBATHER'S EYE PROTECTORS

[75] Inventor: William O. Goulden, Springfield, N.J.

[73] Assignee: Top-Tex, Inc., Summit, N.J.

[21] Appl. No.: 707,700

[22] Filed: Jul. 22, 1976

[51] Int. Cl.² .................. G02C 9/00; G02C 5/04; G02C 5/12

[52] U.S. Cl. ................................ 351/47; 351/128; 351/137; 351/41

[58] Field of Search .............. 351/44, 47, 45, 111, 351/124, 128, 137, 41, 83, 48; 2/443

[56] References Cited

U.S. PATENT DOCUMENTS

| 365,090 | 6/1887 | Newell | 351/128 |
|---|---|---|---|
| 1,723,474 | 8/1929 | Esleck | 351/47 |
| 2,177,610 | 10/1939 | Ehrlich | 351/44 |
| 2,361,910 | 11/1944 | Bernheim | 351/83 |
| 2,545,673 | 3/1951 | Pozarik | 351/59 |
| 3,345,121 | 10/1967 | De Angelis | 351/128 |

Primary Examiner—Paul A. Sacher
Assistant Examiner—Rodney B. Bovernick
Attorney, Agent, or Firm—Brooks, Haidt, Haffner & Delahunty

[57] ABSTRACT

A sunbather's eyes are shielded by eye covers of opaque material while a frame supporting the eye covers transmits tanning radiation to the wearer's face for even tanning of the entire face including the area around the eyes. The frame is made of plastic material that is substantially transparent to ultraviolet light and the eye covers are adjustably mounted on the frame.

6 Claims, 3 Drawing Figures

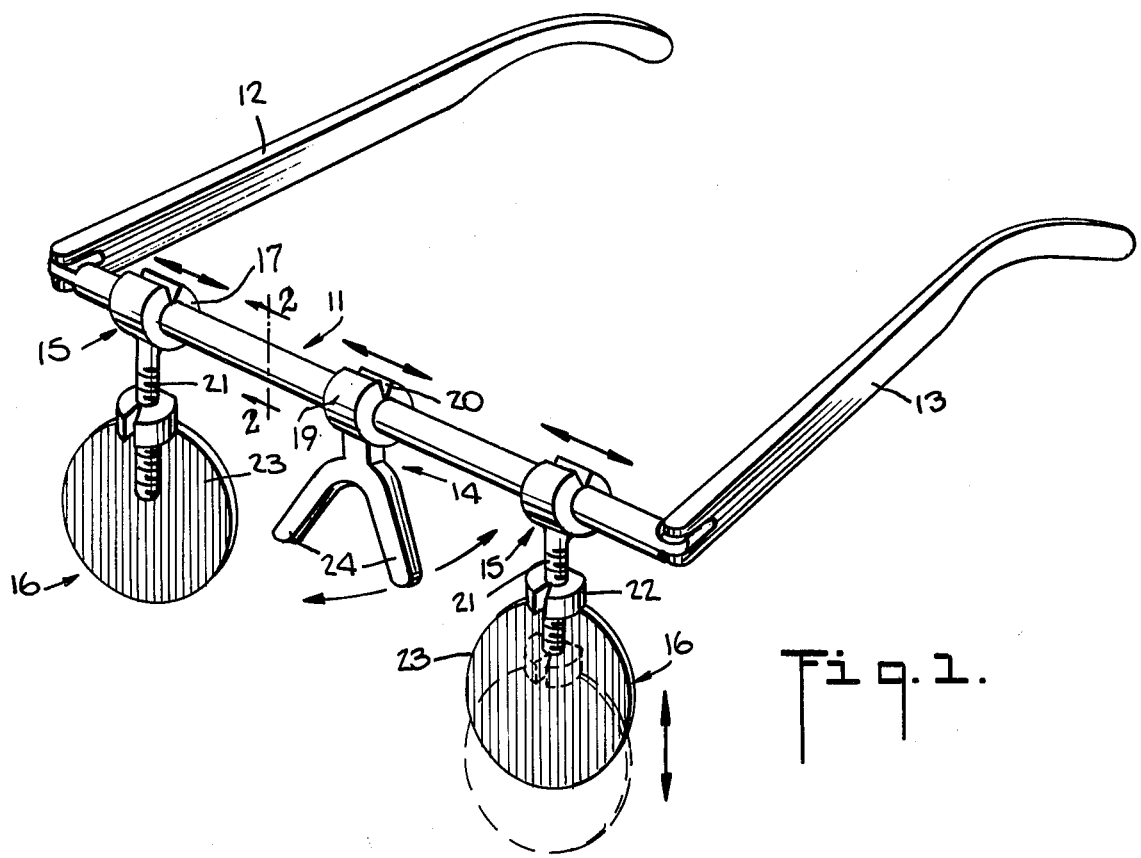
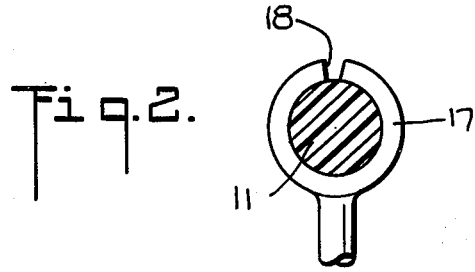
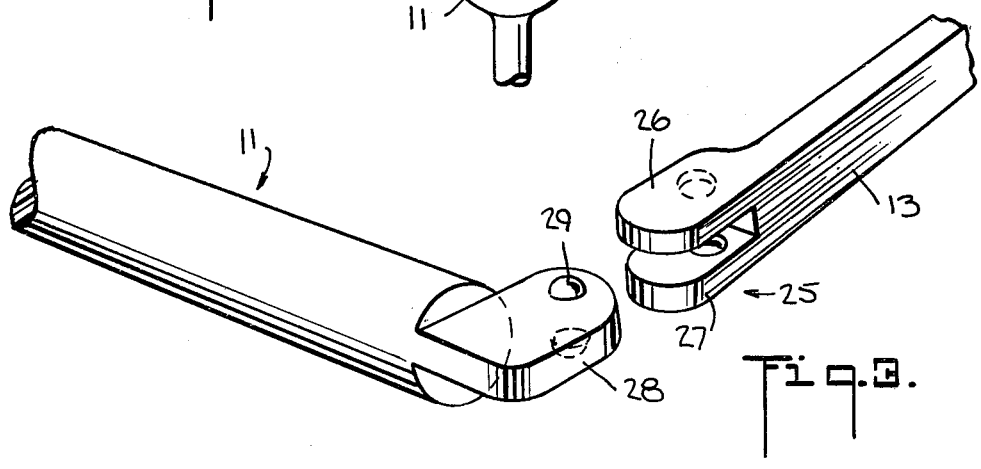

SUNBATHER'S EYE PROTECTORS

BACKGROUND OF THE INVENTION

1. Field of the Invention

The invention relates to protection of the eyes, and more particularly to eye shades for sunbathers.

2. Description of the Prior Art

The frames of ordinary sunglasses and eye shades are opaque to the tanning rays of the sun, so the wearer of such protective devices does not tan in the area covered by such frames. The area of skin left unexposed appears as a pale ring around the eyes contrasting with the tanned skin of the rest of the face.

This problem has been recognized in the prior art. U.S. Pat. No. 2,844,994 to Filler relates to an eyeshield with a small opaque frame fitted to the eye sockets for minimizing the unexposed area. A device fitting closely against the wearer's face and having eyecups with lenses and integrally related wall portions is shown by Baratelli U.S. Pat. No. 2,709,256 which indicates that the lenses and wall portions can be formed of various artificial resinous or plastic materials. Devices like those of the foregoing patents which fit closely against the face adjacent the eyes can be uncomfortable to wear.

SUMMARY OF THE INVENTION

The present invention overcomes the problem of unexposed skin around the eyes while protecting the eyes themselves. Opaque eye covers are mounted on a frame that is transparent to the tanning rays of the sun.

Suntan is produced by ultraviolet radiation, that portion of the spectrum just beyond violet on the short wavelength side with a maximum wavelength of about 3900 angstroms. The atmosphere effectively shields the earth's surface from ultraviolet radiation having wavelengths shorter than about 2900–3000 angstroms, so the tanning radiation of the sun with which the present invention is generally in the near-ultraviolet range of about 2900–3900 angstroms. The frame structure of the eye protectors according to the present invention is formed of material which transmits this tanning radiation, which the eye covers are made of opaque material.

The presently preferred materials for the frame according to the invention are synthetic resinous materials such as polymethyl methacrylate and other acrylic resins or co-polymers thereof, such as vinyl acetate or vinyl chloride acrylic co-polymers, which are good transmitters of ultraviolet light. For most applications the transmission of ultraviolet light is undesirable, so manufacturers commonly add ultraviolet absorbers to commercial plastics, but in the present invention ultraviolet transmitting plastic free from such additives is used for the frame structure.

The eye covers of the device are preferably formed of opaque plastic material, such as an expanded plastic that combines durability with hygienic properties. The covers are mounted adjustably on the frame to be interposed directly between the eyes and the light source, so that regardless of the direction of the light rays with respect to the wearer the eyes and eyelids are protected. Whether the light source is the sun or an artificial sun lamp the wearer of the protective device can easily adjust the eye covers to his position relative to the direction of radiation. To achieve this adjustability the eye covers are preferably mounted on clip members slidable with respect to the frame structure.

In a presently particularly preferred embodiment of the invention, the frame has a transverse crossbar pivotally connected at its ends to temple pieces and the opaque eye covers are adjustably mounted on clips slidable along the crossbar. An adjustable nose clip is mounted on the crossbar between the eye cover clips.

These and other objects and advantages of the sunbathers' eye protectors will be now fully understood from the following detailed description of a preferred embodiment of the invention, especially when that description is read in conjunction with the accompanying drawing.

BRIEF DESCRIPTION OF THE DRAWING

In the drawing, in which like reference characters designate like parts throughout:

FIG. 1 is a view in perspective of the eye protector device of the invention.

FIG. 2 is a view in section taken along line 2—2 of the device of FIG. 1 and looking in the direction of the arrows.

FIG. 3 is a detail view showing pivot construction for the temples of the device according to the invention.

DETAILED DESCRIPTION OF A PREFERRED EMBODIMENT

A preferred form of eye protector according to the invention is shown in FIG. 1 of the drawing to have a frame structure consisting of a crossbar 11 and temple pieces 12 and 13.

The temples 12 and 13 are of conventional shape, pivotally joined to the ends of the crossbar 11 for comfortable fit. Mounted on the crossbar and slidable between the ends thereof are a nose clip 14 and a pair of clips 15 upon which eye covers 16 are adjustably attached.

The elements 11, 12, 13, 14 and 15 are all formed of material that is substantially transparent to the tanning rays of the sun. The preferred material for these frame members is a rigid, yet somewhat resilient plastic. Polymethyl methacrylate, for example, transmits ultraviolet rays very efficiently, and there are other synthetic resinous materials available including other acrylic resins or copolymers thereof, such as vinyl acetate or vinyl chloride acrylic co-polymers that will transmit ultraviolet radiation.

Manufacturers of plastics commonly add ultraviolet absorbers to reduce transmittance of ultraviolet radiation, but for the purposes of this invention, plastics having high transmittance of ultraviolet radiation combined with stability of appearance and sufficient strength and durability are required for the frame members. The eye covers 16 themselves are not made of material transparent to ultraviolet light, and are preferably opaque to visible light as well. The parts 16 can thus be formed of a variety of opaque materials, and are preferably made of expanded plastic selected for good wearing and hygienic properties.

In the preferred embodiment of the invention shown the crossbar 11 and clip members 14 and 15 are shaped for sliding adjustment of the clip members 14 and 15 along the length of the crossbar 11. Thus, as shown in the drawing, the crossbar 11 is preferably cylindrical in cross section. The clip members 14 are secured to the crossbar 11 by integrally formed connectors 17 in the shape of incomplete annuli, i.e. as rings having slots parallel to their axes as shown in FIG. 2. The ring like connectors 17 have, in their unstressed state, an inside diameter slightly smaller than the diameter of the crossbar 11, so that they grip the crossbar 11 and remain in a selected position after adjustment. The nose clip 14 has a connector element 19 formed as an incomplete ring with a slot 20 similar to the connectors 17 of the eye cover clips 15.

For adjustment toward and away from the crossbar 11 the eye covers 16 are fitted on threaded or grooved shank portions 21 of the clips 15 as shown in FIG. 1. Each eye cover 16 is shown to have a fastener 22 in the form of an incomplete, slotted ring integrally formed with a flat disc-shaped member 23 that covers the wearer's eye. Like the connectors 17 and 19, the fastener 22 resiliently grips to remain in its selected position after adjustment.

The nose clip 14 is generally arch or fork shaped with a pair of outwardly and downwardly spreading legs 24 to embrace opposite sides of the bridge of the wearer's nose. The nose clip is adjustable not only along the length of the crossbar 11, but also, by swiveling around the crossbar 11 to any desired angle with respect to the positions of the eye covers 16, which can themselves be swiveled forward or back toward the wearer's face. The nose clip 14 is transparent to ultraviolet tanning radiation.

In the embodiment shown the cylindrical shape of the crossbar permits swiveling of the nose clip 14 and the eye covers 16. The crossbar could have some other profile, such as rectangular and the clips 15 could have connectors of some different form, but the flexibility of adjustment provided by the cylindrical shaped crossbar is presently preferred.

FIG. 3 shown in detail a preferred form of pivotable connection between the crossbar 11 and the temple pieces 12 and 13 which avoids the use of pins or like fasteners and permits use of ultraviolet transparent material throughout the frame. It will be seen that the temple piece 13 terminates in a bifurcated end 25 with upper and lower arms 26 and 27 having flat opposed inner faces spaced to receive a narrowed flattened end portion 28 of the crossbar 11 which end 28 turns inward toward the bifurcated end 25. The end portion 28 of the crossbar is formed with a pair of oppositely extending semi-spherical protuberances 29 for fitting into mating indentations 30 in the inner faces of the arms 26 and 27 to providing a pivot joint. It will also be seen that this formation of the ends 28 of the crossbar 11 facilitates sliding on of the clips 14 and 15 during assembly of the device of the invention.

Various modifications, substitutions of materials and adaptations of the device described will suggest themselves to those familiar with the art. For example the discs 23 of the eye covers could be oval or some other shape than circular.

What is claimed is:

1. A sunbather's eye protective device comprising a pair of generally disc shaped opaque eye covers sized to cover the eyes and eyelids of a wearer, a frame comprising a crossbar and temple pieces pivotably attached to opposite ends of said crossbar, and means for adjustably mounting said eye covers on said crossbar so that they are movable in the vertical and horizontal directions, said frame, mounting means and all parts other than the eye covers being made of synthetic resinous material which is substantially transparent to the tanning rays of the sun.

2. The device of claim 1 wherein the eye covers are attached to clips formed of material that is substantially transparent to the tanning rays of the sun, each of such clips having an incomplete annular connector slidable along said crossbar for adjusting the position of the eye covers.

3. The device of claim 1 wherein each eye cover is attached to a clip slidable along said crossbar, each clip comprising an incomplete ring for resiliently gripping said crossbar and a shank portion extending from said ring for adjustable attachment of said eye cover.

4. The eye protectors of claim 1 wherein said synthetic resinous material is an acrylic resin or a copolymer thereof.

5. The eye protectors of claim 1 wherein the synthetic resinous material is selected from the group of materials consisting essentially of polymethyl methacrylate, vinyl acetate and vinyl chloride acrylic co-polymer.

6. The device of claim 1 and including a nose clip slidably fitted on said crossbar between said eyecovers, said clip being formed of material that is substantially transparent to the tanning rays of the sun.

* * * * *